(12) United States Patent
Galford

(10) Patent No.: US 9,310,514 B2
(45) Date of Patent: Apr. 12, 2016

(54) METHOD AND SYSTEM OF DETERMINING ELEMENTAL CONTENT OF AN EARTH FORMATION

(75) Inventor: James E. Galford, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 521 days.

(21) Appl. No.: 13/810,975

(22) PCT Filed: Aug. 24, 2010

(86) PCT No.: PCT/US2010/046428
§ 371 (c)(1),
(2), (4) Date: Jan. 18, 2013

(87) PCT Pub. No.: WO2012/026921
PCT Pub. Date: Mar. 1, 2012

(65) Prior Publication Data
US 2013/0124094 A1    May 16, 2013

(51) Int. Cl.
*G06F 17/12*    (2006.01)
*G01V 5/10*    (2006.01)

(52) U.S. Cl.
CPC ...................................... *G01V 5/101* (2013.01)

(58) Field of Classification Search
CPC ......... G06F 17/12; G06F 17/13; G06F 17/16; G06F 17/18; G01V 5/00; G01V 5/04; G01V 5/06; G01V 5/08; G01V 5/085; G01V 5/10; G01V 5/101; G01V 5/102; G01V 5/104; G01V 5/105; G01V 5/107; G01V 5/108; G01V 5/12; G01V 5/125; G01V 5/14; G01V 5/145
See application file for complete search history.

(56) References Cited

U.S. PATENT DOCUMENTS 3,156,822 A    11/1964    Tittman
3,219,820 A    11/1965    Hall
(Continued)

FOREIGN PATENT DOCUMENTS

GB    2427024    12/2006
WO    2007015953    2/2007

OTHER PUBLICATIONS

Galford et al., Improving Pulsed Neutron Gamma Ray Spectroscopy Elemental Weight Percent Estimates Through Automatic Dimensioning of the Spectral Fitting Process, Oct. 2-5, 1988, SPE 63rd Annual Technical Conference and Exhibition, Houston, Texas, 16 pp.*

(Continued)

*Primary Examiner* — Toan Le
(74) *Attorney, Agent, or Firm* — Chamberlain Hrdlicka

(57) ABSTRACT

Determining elemental content of an earth formation. At least some of the illustrative embodiments are methods including: irradiating a portion of a formation that surrounds a borehole; counting gammas to obtain a spectrum of counted gammas; finding a solution to a system of equations based on the spectrum of counted gammas, which system of equations has a plurality of solutions, the solution being indicative of a plurality of weight percentages for a respective plurality of elements within the formation; determining whether the solution meets a predetermined constraint; repeating the finding and determining until a solution is found that is determined to meet the predetermined constraint; and producing an indication of the elemental content of the formation using the solution that meets the predetermined constraint.

23 Claims, 15 Drawing Sheets

(56) References Cited

U.S. PATENT DOCUMENTS

| | | | |
|---|---|---|---|
| 3,521,064 | A | 2/1967 | Moran et al. |
| 3,932,747 | A | 1/1976 | Sherman |
| 4,078,174 | A | 3/1978 | Goldman |
| 4,394,574 | A | 7/1983 | Grau et al. |
| 4,661,701 | A | 4/1987 | Grau |
| 4,736,204 | A | 4/1988 | Davison |
| 4,810,876 | A | 3/1989 | Wraight et al. |
| 4,928,088 | A | 5/1990 | Jorion et al. |
| 4,992,787 | A | 2/1991 | Helm |
| 5,021,653 | A | 6/1991 | Roscoe et al. |
| 5,120,955 | A | 6/1992 | Galford |
| 5,369,578 | A | 11/1994 | Roscoe et al. |
| 5,528,029 | A | 6/1996 | Chapellat et al. |
| 5,675,147 | A | 10/1997 | Ekstrom et al. |
| 5,814,988 | A | 9/1998 | Itskovich et al. |
| 5,817,267 | A | 10/1998 | Covino et al. |
| 5,825,024 | A | 10/1998 | Badruzzaman |
| 6,124,590 | A | 9/2000 | Mickael |
| 6,215,304 | B1 | 4/2001 | Slade |
| 6,246,236 | B1 | 6/2001 | Poitzsch et al. |
| 6,831,571 | B2 | 12/2004 | Bartel |
| 6,851,476 | B2 | 2/2005 | Gray et al. |
| 6,967,589 | B1 | 11/2005 | Peters |
| 7,205,535 | B2 | 4/2007 | Madgian et al. |
| 7,253,402 | B2 | 8/2007 | Gilchrist et al. |
| 7,294,829 | B2 | 11/2007 | Gilchrist |
| 7,361,887 | B2 | 4/2008 | Trcka et al. |
| 7,365,307 | B2 | 4/2008 | Stoller et al. |
| 7,365,308 | B2 | 4/2008 | Trcka et al. |
| 7,372,018 | B2 | 5/2008 | Trcka et al. |
| 2005/0139759 | A1 | 6/2005 | Pitts et al. |
| 2007/0023626 | A1 | 2/2007 | Riley et al. |
| 2007/0246649 | A1 | 10/2007 | Jacobi et al. |
| 2009/0114806 | A1 | 5/2009 | Kirkwood et al. |

OTHER PUBLICATIONS

Canadian Office Action dated Nov. 6, 2014 for Canadian Application No. 2,804,835. (4 pages).

International Search Report and Written Opinion issued May 31, 2011 in International Application No. PCT/US2010/046428.

Schweitzer, J.S. et al. Gamma Ray Spectroscopy Tool: Environmental Corrections. Journal of Petroleum Technology. pp. 1527-1534. Sep. 1984.

Hertzog, R. et al. Geochemical Logging with Spectrometry Tools. SPE Formation Evaluation. pp. 153-162. Jun. 1988. SPE 16792. Presented at SPE Annual Technical Conference and Exhibition; Dallas, Texas; Sep. 27-30, 1987.

Pemper, R. et al. A New Pulsed Neutron Sonde for Derivation of Formation Lithology and Mineralogy. SPE 102770. Presented at 2006 SPE Annual Technical Conference and Exhibition; San Antonio, Texas. Sep. 24-27, 2006.

Briesmeister, J.F., ed. MCNP—A General Monte Carlo N-Particle Transport Code. Version 4C. LA-13709-M Manual. 2000.

Jacobson, L.A. et al. Intrinsic Capture Cross-Section and Porosity Transform for the TMD-L Pulsed Neutron Capture Tool. SPE 30597. Society of Petroleum Engineers, Inc. 1995. Presented at SPE Annual Technical Conference and Exhibition; Dallas, TX; Oct. 22-25, 1995.

Badruzzaman, A. et al. Is Accurate Gas/Steam Determination Behind Pipe Feasible with Pulsed Neutron Measurements? SPE 110098. SPE Asia Pacific Oil and Gas Conference; Jakarta, Indonesia. Oct. 30-Nov. 1, 2007.

Badruzzaman, A. et al. Multi-Sensor Through-Casing Density and Saturation Measurement Concepts with a Pulsed Neutron Source: A Modeling Assessment. SPE 89884. Society of Petroleum Engineers, Inc. 1994. SPE International Petroleum Conference; Puebla, Mexico; Nov. 8-9, 2004.

Badruzzaman, A. et al. Progress and Future of Pulsed Neutron Technology in Oil Field Management. SPE 49228 Society of Petroleum Engineers, Inc. 1998. SPE Annual Technical Conference and Exhibition; New Orleans, Louisiana; Sep. 27-30, 1998.

Odom, R. et al. Design and Initial Field-Test Results of a New Pulsed-Neutron Logging System for Cased Reservoir Characterization. SPWLA 2008, Paper O. Society of Petrophysicists and Well Log Analysts, 2008. Presented at SPWLA 49th Annual Logging Symposium; Edinburgh, Scotland; May 25-28, 2008.

MacDonald, R. et al. Using Elemental Geochemistry to Improve Sandstone Reservoir Characterization: A Case Study from the Unayzah A Interval of Saudi Arabia. Society of Petrophysicists and Well Log Analysts, 2010. Presented at SPWLA 51st Annual Logging Symposium; Perth, Australia; Jun. 19-23, 2010.

\* cited by examiner

METHOD AND SYSTEM OF DETERMINING ELEMENTAL CONTENT OF AN EARTH FORMATION

CROSS-REFERENCE TO RELATED APPLICATIONS

None.

BACKGROUND

Nuclear formation evaluation tools interrogate the formation surrounding the borehole with neutrons. Through various types of interactions by the neutrons with elements of the formation, gamma radiation is created that is incident upon one or more gamma radiation detectors also associated with the tool. Formation properties can be predicted based on the number of arrivals and/or energy of the gamma radiation. However, the mathematical analysis of the number of arrivals and/or energy of gamma radiation to arrive at a prediction of formation properties in some cases does not accurately reflect the actual formation properties of interest. Thus, any system or method that helps reduce errors in mathematically predicted formation properties could improve the sensitivity and accuracy of formation interrogation based on gamma radiation detection.

BRIEF DESCRIPTION OF THE DRAWINGS

For a detailed description of exemplary embodiments, reference will now be made, by way of example only, to the accompanying drawings in which.

NOTATION AND NOMENCLATURE

Certain terms are used throughout the following description and claims to refer to particular system components. As one skilled in the art will appreciate, oilfield service companies may refer to a component by different names. This document does not intend to distinguish between components that differ in name but not function.

In the following discussion and in the claims, the terms "including" and "comprising" are used in an inclusive fashion, and thus should be interpreted to mean "including, but not limited to . . . ". Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy created and/or released due to neutron interaction with atoms, and in particular atomic nuclei, and shall include such energy whether such energy is considered a particle (i.e., gamma particle) or a wave (i.e., gamma ray or wave).

"Spectrum of counted gammas" shall mean a plurality of count values, each count value representing a count (or count rate) of gammas detected having energies in a predetermined range of energies.

"Continuous", with respect to a source of neutrons, shall mean that during the period of time that gammas are detected to create a spectrum of counted gammas, the neutron source produces/releases neutrons. The fact that a neutron source may be turned off during periods of non-use shall not negate the "continuous" use during logging operations.

"About", with respect to energy of neutrons, shall mean within ten (10) percent of the stated energy.

"Mineral" shall mean a substance occurring in nature comprised of multiple elements.

"Element" shall mean a substance that cannot be separated into simpler substances by chemical reaction (i.e., elements are listed on the periodic table).

"Weight percentage" shall mean not only relative weight of an element as a percentage of total weight, but shall also include relative weight expressed as a fraction (which fraction multiplied by 100 gives a percentage).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
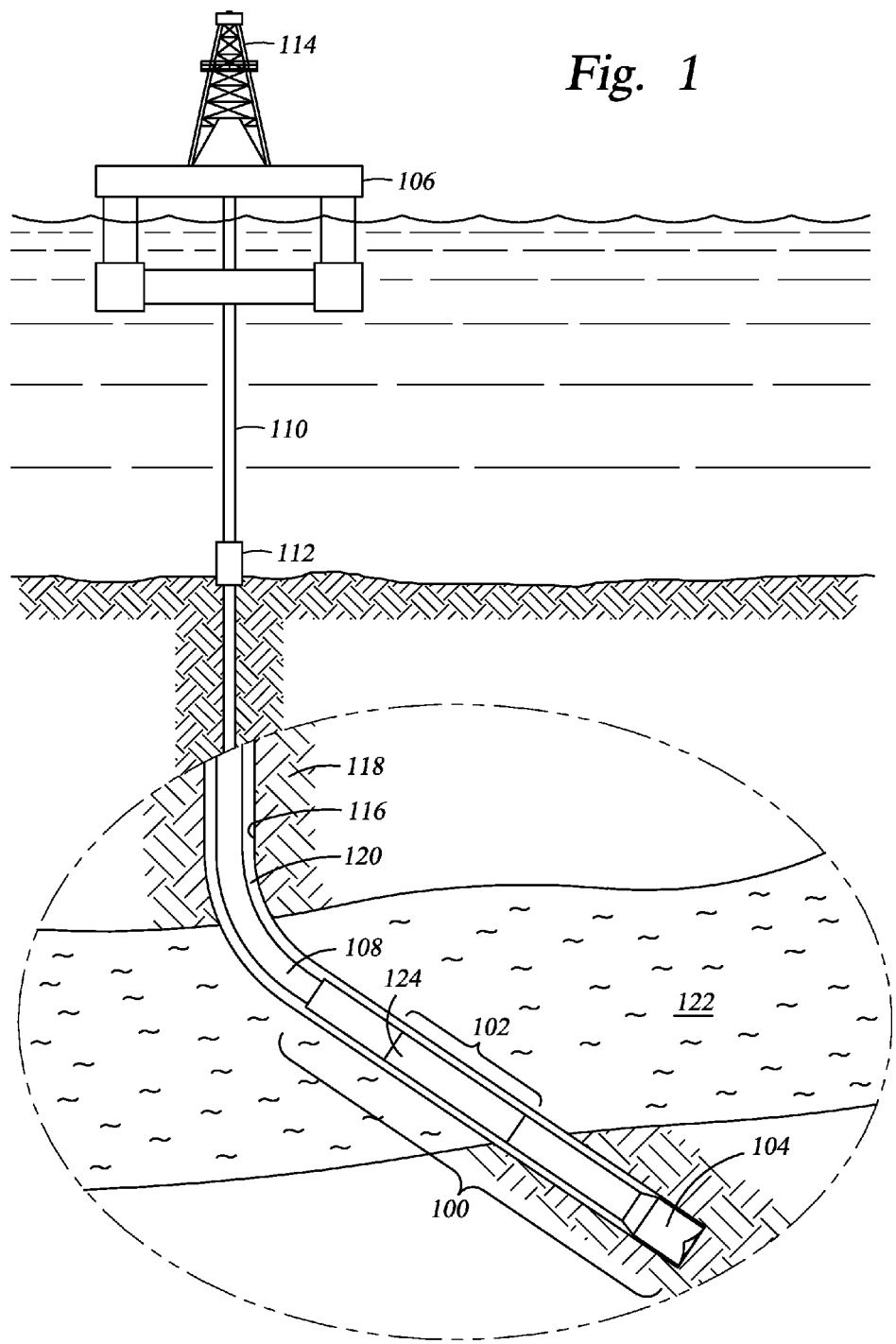
FIG. 1 shows a system in accordance with at least some embodiments.

FIG. 1 shows a bottom hole assembly 100 for a drilling operation, where the bottom hole assembly 100 comprises a formation evaluation tool 102 and a drill bit 104. The bottom hole assembly 100 is lowered from a drilling platform 106, such as a ship or other drilling platform, by way of a drill string 108. The drill string 108 extends through a riser 110 and a well head 112. Drilling equipment supported within and around derrick 114 rotates the drill string 108 and the drill bit 104, causing the bit 104 to form a borehole 116 through the formation material 118. The volume defined between the drill string 108 and the borehole 116 is referred to as the annulus 120. The borehole 116 penetrates subterranean zones or reservoirs, such as reservoir 122, believed to contain hydrocarbons in a commercially viable quantity. It is also consistent with the teachings herein that the tool 102 is employed in other bottom hole assemblies and with other drilling apparatus in land-based drilling with land-based platforms, as well as offshore drilling as shown in FIG. 1. In addition to the tool 102, the bottom hole assembly 100 may also contain various other systems, such as a down hole drill motor, a rotary steerable tool, a mud pulse telemetry system, and other measuring-while-drilling and/or logging-while-drilling sensors and systems.

In some embodiments, the information gathered by the tool 102 may be stored within the tool 102 and read when the tool 102 is raised to the surface or the platform 106. In other embodiments, some or all the information gathered by the tool may be sent to the surface or platform 106 while the tool 102 is within the borehole 116. For example, some or all the information gathered by the tool 102 may be sent encoded in pressure pulses in the drilling fluid within the drill string 108. In yet still other embodiments, the information gathered by the tool 102 may be sent over a communication pathway embedded within the pipes of the drill string 108, such as by electrical conductors or optical conductors.

The tool 102 may be coupled within the bottom hole assembly 100 by any suitable mechanism. For example, in some embodiments the tool 102 has a threaded male "pin" end connector on one end, and a threaded female "box" end connector on the other end, such that the tool 102 couples to other components of the bottom hole assembly 100. In some cases, at least a portion of the outer surface 124 forms a pressure vessel within which various components for generating neutrons and detecting gammas are located. Moreover, a fluid conduit (not visible in FIG. 1) may also reside within the outer surface 124, and drilling fluid passes through the fluid conduit on its journey to the drill bit 104.

Figure 2:
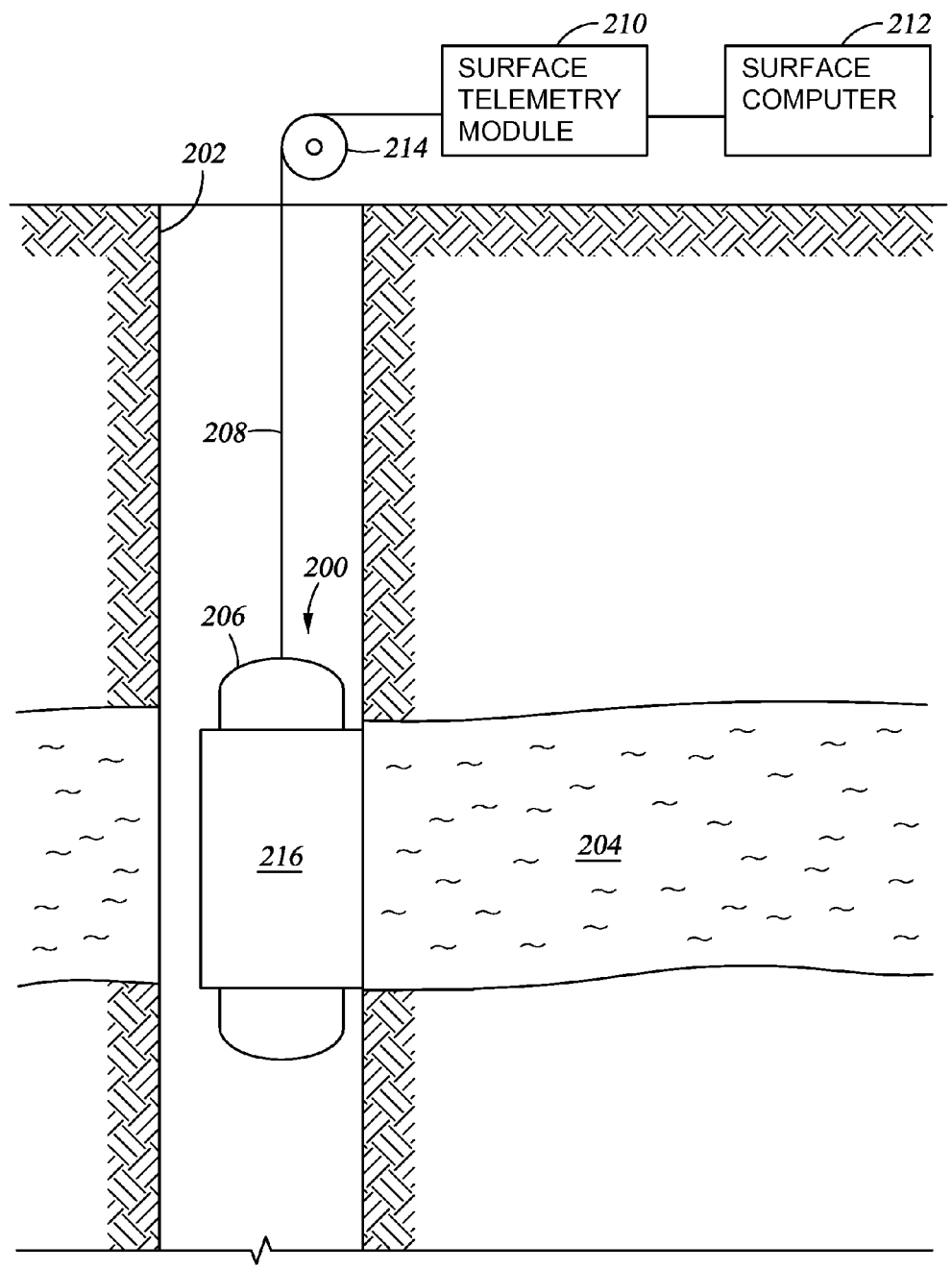
FIG. 2 shows a system in accordance with at least some embodiments.

While in some embodiments the formation evaluation tool is used in drilling operations, in yet still other embodiments the formation evaluation tool is used in wireline logging operations. In particular, FIG. 2 illustrates a wireline logging system that comprises a logging tool 200 placed within a borehole 202 proximate to a formation 204 of interest. The tool 200 comprises a pressure vessel 206 within which various subsystems of the tool 200 reside, and in the illustrative case of FIG. 2 the pressure vessel 206 is suspended within the borehole 202 by a cable 208. Cable 208, in some embodiments a multi-conductor armored cable, not only provides support for the pressure vessel 206, but also in these embodiments communicatively couples the tool 200 to a surface telemetry module 210 and a surface computer 212. The tool 200 may be raised and lowered within the borehole 202 by way of the cable 208, and the depth of the tool 200 within the borehole 202 may be determined by depth measurement system 214 (illustrated as a depth wheel). In some embodiments, the pressure vessel 206 may be covered with a thermal neutron absorptive material 216 (the thickness of which is exaggerated for clarity of the figure); however, in other embodiments the material 216 may be only partially present or omitted altogether.

Figure 3:
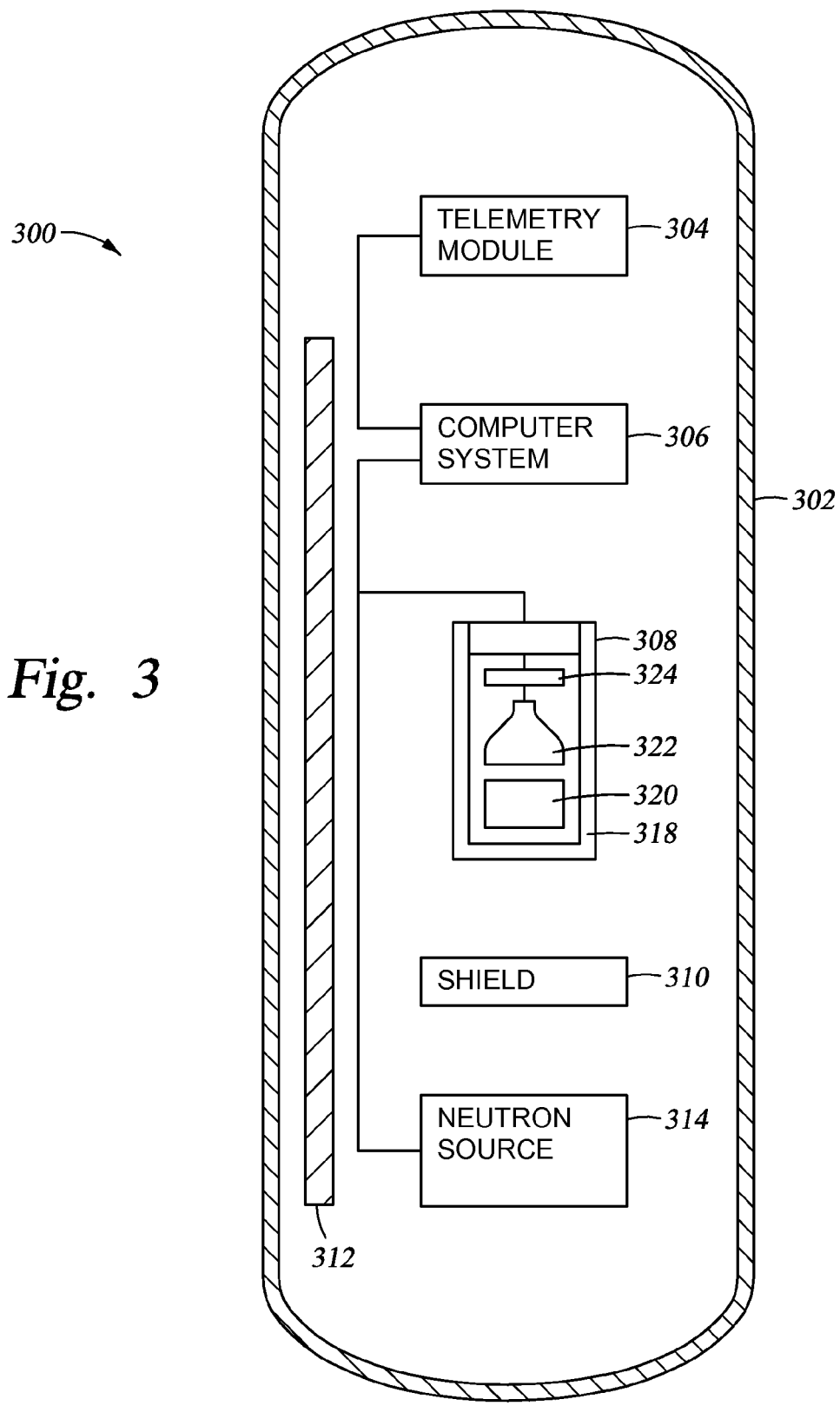
FIG. 3 shows a simplified cross-sectional view of a logging tool in accordance with at least some embodiments.

FIG. 3 shows a simplified partial cross-sectional view of a logging tool 300 in accordance with at least some embodiments. Logging tool 300 is illustrative of either tool 102 in bottom hole assembly 100 or wireline tool 200. Pressure vessel 302 seals the various internal components from contact with borehole fluids and pressures. Within the pressure vessel 302 illustratively reside a telemetry module 304, computer system 306, a gamma detector 308, a neutron shield 310, a borehole shield 312 and a neutron source 314. Gamma detector 308 detects the arrival and energy of gammas, and in FIG. 3 is shown above the neutron source 314. In other embodiments, the gamma detector 308 may be below the neutron source. In a particular embodiment, gamma detector 308 is 14.6 inches from the neutron source 314, but other spacing, and additional gamma detectors, may be equivalently used.

Neutron source 314 is a continuous or controllable source of neutrons. In a particular embodiment, neutron source 314 is an Americium/Beryllium neutron source, which is a continuous source and which has mean neutron energy of about 4.5 Mega-electron Volt (MeV). In other embodiments, the neutron source 314 is a Californium 252 source, which is a continuous source and which has mean neutron energy of about 2.3 MeV. However, any neutron source capable of producing and/or releasing neutrons with sufficient energy may be equivalently used. Neutron source 314 is shown electrically connected to the computer system 306 in FIG. 3 for controllable (i.e., pulsed) neutron sources; however, the electrical connection would not be required for continuous sources. In the case of pulsed sources, the neutron source 314 would produce the neutrons under command from surface computer system 212 (FIG. 2, in the case of wireline tools), or under command from computer system 306 within the tool (in the case of measuring-while-drilling (MWD), logging-while-drilling (LWD) or slickline tools).

In order to reduce the irradiation of the gamma detector 308 and other devices by the neutrons from the neutron source 314, the illustrative logging tool 300 of FIG. 3 further comprises neutron shield 310 (e.g., HEVIMET® available from General Electric Company of Fairfield, Conn.). The neutron shield 310 separates the neutron source 314 from the gamma detector 308, and reduces the number of neutrons incident upon the gamma detector 308. Moreover, in some cases the tool 300 is designed and constructed to have directional sensitivity with respect to gammas. For example, during use, rather than being centered within the borehole, the tool 300 may be placed proximate the borehole wall. In order to create the directional sensitivity, and reduce the number of gammas entering the tool and the detector from the borehole, the illustrative tool 300 comprises a borehole shield 312 (e.g., which may also be HEVIMET®). Thus, the borehole shield 312 creates directional sensitivity of the gamma detector 308 toward the side of the tool that, in operation, is held closest to the formation of interest.

Still referring to FIG. 3, and particularly to gamma detector 308, a gamma detector in accordance with at least some embodiments comprises an enclosure 318 (shown in cross-section), and within the enclosure 318 resides: a crystal 320 (e.g., a bismuth germinate scintillation crystal); a photo multiplier tube 322 in operational relationship to the crystal 320; and a processor 324 coupled to the photomultiplier tube 322. As gammas are incident upon/within the crystal 320, the gammas interact with the crystal 320 and flashes of light are emitted. Each flash of light itself is indicative of an arrival of a gamma, and the intensity of light is indicative of the energy of the gamma. The output of the photomultiplier tube 322 is proportional to the intensity of the light associated with each gamma arrival. The processor 324 quantifies the output as gamma energy and relays the information to the surface computer 212 (FIG. 2) by way of the telemetry module 304 in the case of a wireline tool, or to the computer system 306 within the tool in the case of a MWD, LWD or slickline tools.

In operation of the tool 300, the neutron source 314 produces neutrons such that a neutron flux is created around the tool 300, the neutron flux extending into the surrounding formation. The neutrons produced interact with elements that make up the minerals in the formation by way of a variety of mechanisms, including thermal capture. In particular, after one or more collisions (and corresponding loss of energy) a neutron reaches an energy known as thermal energy (i.e., a thermal neutron). When neutrons are at thermal energy the neutrons can be captured by atomic nuclei. In particular, in a capture event the capturing atomic nucleus absorbs the thermal neutron, and then responsive to the energy of the thermal neutron the capturing nucleus enters an excited state. The excited nucleus later transitions to a lower energy state by release of energy in the form of gammas (known as thermal gammas—based on the mechanism of the gamma creation, not the energy of the gammas).

The energy spectrum of the gammas created as a nucleus transitions to the lower energy state is characteristic of the element of the nucleus that captured the neutron. Thus, if a formation consisted of a single element, identification of the element would only require identifying the characteristic spectrum of gamma energy of the element. However, formations consist of multiple minerals, with each mineral comprising multiple elements. Every element in the formation may capture thermal neutrons, and release gammas. Thus, the gammas received at the illustrative gamma detector 308 are a composite of the gamma spectrum released by all the various elements within a formation.

In accordance with at least some embodiments, the gamma arrivals at the gamma detector 308 are tracked based on energy. More particularly, a gamma energy range of interest is broken into a plurality of energy channels or "bins". That is, rather than keeping track of the energy of each gamma arrival, in accordance with particular embodiments the energy spectrum of interest is divided into bins, and the number of arrivals in each bin is used, rather than the specific energy of each arrival.

Figure 4:
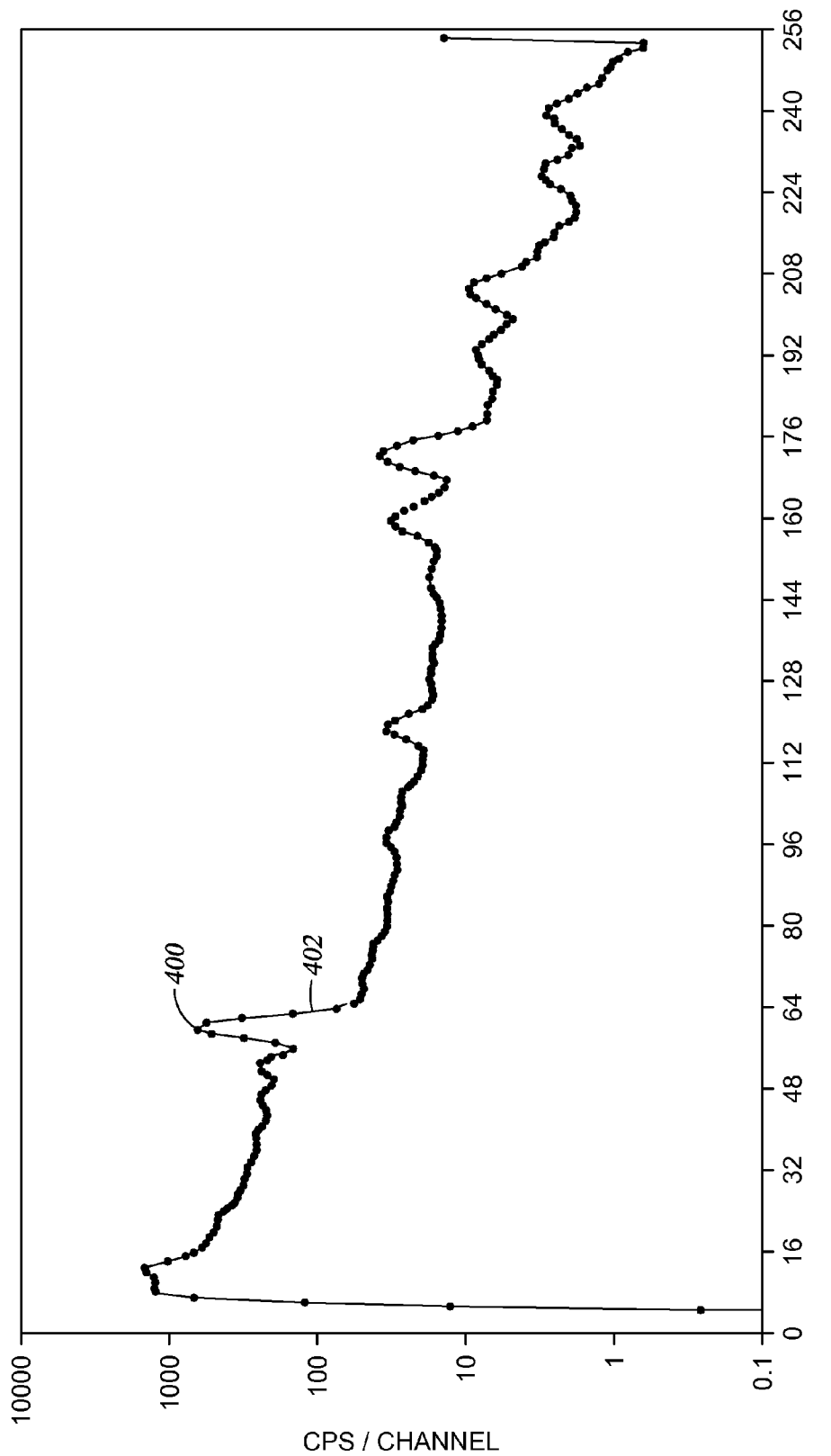
FIG. 4 shows a spectrum of counted gammas in accordance with at least some embodiments.

FIG. 4 shows an illustrative spectrum of counted gammas, with the energy shown along the ordinate axis, and the gamma count along the abscissa. In particular, the energy spectrum of interest is divided into an illustrative 256 bins (numbered bin 1 to bin 256), with each bin spanning about 37.3 Kilo-electron Volts (KeV). Greater or fewer numbers of bins may be equivalently used, and correspondingly different bin energy widths may be equivalently used. For the illustrative bin energy width of 37.3 KeV, the count value in bin 1 is incremented for each gamma detected having an energy of between 0 and about 37.3 KeV, the count value in bin 2 is incremented for each detected gamma detected having an energy between about 37.4 and about 74.6 KeV, and so on, with bin 255 being incremented for each detected gamma having an energy of between 9.462 and 9.5 MeV. Illustrative bin 256 is incremented for each detected gamma having energy above 9.5 MeV. In some embodiments, the gamma values in each bin are accumulated for 250 milliseconds, but shorter and longer collection times may be equivalently used. In the illustrative graph of FIG. 4, the number of gammas counted within each energy bin is illustrated by a dot in the center of each bin, for example the dot 400 associated with bin 60. Line 402 connects the dots representing the counts in each bin merely to better illustrate the spectrum of counted gammas created. While FIG. 4 is discussed in terms of a count in each bin over a predetermined period of time, in accordance with other embodiments the gamma arrival rate or count rate (e.g., counts per second) within each bin is used.

In accordance with various embodiments, a mathematical analysis is performed using the spectrum of counted gammas to arrive at a solution indicative of the elemental makeup of the formation (i.e., the formation lithology). In particular, a system of equations is created, where the equations relate a spectral response (count values across the gamma energy range of interest) as a linear combination of reference elemental responses, or spectral standards. The system of linear equations is solved, with solutions indicated by minima of a $\chi^2$ objective function, and the solutions are thus indicative of the formation mineralogical content. An illustrative set of linear equations has the form:

$$y_1 = S_{11}\gamma_1 + S_{12}\gamma_2 + S_{13}\gamma_3 + \cdots + S_{1m}\gamma_m \quad (1)$$
$$y_2 = S_{12}\gamma_1 + S_{22}\gamma_2 + S_{23}\gamma_3 + \cdots + S_{2m}\gamma_m$$
$$y_3 = S_{31}\gamma_1 + S_{32}\gamma_2 + S_{33}\gamma_3 + \cdots + S_{3m}\gamma_m$$
$$\vdots \quad \vdots \quad \vdots \quad \vdots \quad \vdots \quad \vdots \quad \vdots \quad \vdots$$
$$y_n = S_{n1}\gamma_1 + S_{n2}\gamma_2 + S_{n3}\gamma_3 + \cdots + S_{nm}\gamma_m$$

where $y_i$ represents a calculated count value in channel or bin i of the spectrum, $\gamma_j$ is the elemental yield depicting the contribution of element j to the total response, and $S_{ij}$ is a constant being the reference spectral response in bin i to element j. The y and $\gamma_j$ parameters are variables in solver. In matrix notation the system of equations becomes y=S$\gamma$.

The $\chi^2$ objective function is expressed as:

$$\chi^2 = \sum_i \frac{(y_i - m_i)^2}{v_i} \quad (2)$$

where $m_i$ is the measured response in channel or bin i (actual count value), and $v_i$ is the variance of the measured response in bin i. In evaluating $\chi^2$ it is assumed the measured response is properly aligned with the reference spectrum and the energy resolution of the measured and reference spectrum are the same. A Gaussian broadening function may also be applied to standard spectra having nominal energy resolution to account for differences between the energy resolution of the measured and standard spectra. Solutions may be found by invoking a solver code, such as NPSOL available from Stanford Business Software, Inc. of Mountain View, Calif., or MCR developed by Tauler at the University of Barcelona. A solution to the system of linear equations thus results in a plurality of elemental yield values (i.e., the $\gamma_j$) indicative of the elemental makeup of the formation, which in turn is indicative of the mineralogical makeup of the formation.

Before proceeding further, it is helpful to point out several shortcomings and difficulties in the related-art that the various embodiments at least partially, if not fully, address. In particular, there are elements that may be present in the minerals of a formation, where the elements are difficult to detect (e.g., magnesium and aluminum). To illustrate, consider that each thermal capture event of an illustrative calcium nucleus produces gammas, and the number of gammas produced by calcium nucleus in a capture event is orders of magnitude (e.g., two orders of magnitude) more gammas than a magnesium nucleus thermal capture event. Moreover, the microscopic capture cross-section (i.e., the probability of capturing a thermal neutron) for calcium is an order of magnitude greater than the microscopic capture cross-section for magnesium. Thus, even if in a hypothetical formation the calcium and magnesium weight percentages are equal, the gamma response by calcium to thermal neutron irradiation will vastly overshadow the gamma response of magnesium. In practice, the presence or absence of magnesium differentiates limestone (with no magnesium) from dolomite (with a mere 13% or so magnesium) formations. Detecting aluminum relative to other elements is difficult for similar reasons.

Another difficulty is that not all mathematically viable solutions to the illustrative system of linear equations above correspond to a real word situation. For example, the illustrative system of linear equations above has a plurality of mathematically viable solutions, but some such solutions result in negative values of elemental yield for certain elements. Of course, it is not physically possible to have a negative elemental yield, which would imply a negative abundance of an element in the formation, and thus such mathematical solutions are physically impossible. Related-art systems recognize that solutions that are indicative of negative elemental yields in formations are not viable solutions, and thus limit the solutions to non-negative elemental yields. For example, co-pending PCT application "Nuclear Logging Tool Calibration System and Method" filed Jul. 31, 2009, assigned to the same assignee and by the same inventor as the current specification, discusses limiting solution variables within reasonable boundary limits.

However, the inventor of the current specification has determined that even solutions to the illustrative system of linear equations limited to non-negative elemental yields of elements may still produce results that are not physically possible, or that are not physically probable, in formations. Thus, in accordance with various embodiments, not only are the solutions to the illustrative system of linear equations limited to solutions that are indicative of non-negative elemental yields, but the solutions are also limited to solutions that fall within constraints related to the weight percentages of elements in known minerals.

Although the constraints may be applied in a variety of ways, in accordance with at least some embodiments the constraints are applied by the solver program during the solving process, and thus the constraints are conveyed to the solver mathematically. As will be explained more fully below, the mathematical representation of the constraints is based on a relationship between gamma counts attributable to each element in relation to the weight percentage of each element. In particular, the gamma counts for a particular element are a function of the thermal neutron flux, microscopic capture cross-section for the particular element, the number of gammas produced by the element for each capture event, density of the element in the formation, the volume of the formation being tested, and sensitivity terms. More mathematically, the elemental yield $\gamma_x$ for an element x of a particular portion of a formation proximate a gamma detector may be represented by the following expression:

$$\gamma_x = \Phi \sigma_x \Gamma_x N_x V E_d \tag{3}$$

where $\Phi$ is thermal neutron flux in neutrons/cm²-s, $\sigma_x$ is microscopic thermal neutron absorption cross-section for element x in cm²/atom, $\Gamma_x$ is the number of gamma rays produced per neutron absorbed by element x, $N_x$ is atomic number density of element x in atoms/cm³, V is the region volume in cm³ and $E_d$ is detector efficiency expressed as the number of gammas detected per prompt gamma actually produced. The $N_x$ atomic number density may be expanded, yielding:

$$\gamma_x = \Phi \sigma_x \Gamma_x \frac{w_x \rho N_{Av}}{m_x} V E_d \tag{4}$$

where $w_x$ is weight percentage or weight fraction of element x in the sample in grams of element x per gram of sample, $\rho$ is density of the sample in g/cm³, $N_{Av}$ is Avogadro's number, and $m_x$ is mass of element x per mole.

By combining constants and the terms related to the sample and detector sensitivity into a "tool" sensitivity factor, equation (4) can be reduced to:

$$\gamma_x = \Phi S_x w_x \tag{5}$$

where $S_x$ is a tool sensitivity factor. Equation (5) indicates that elemental yield for element x is proportional to the neutron flux in the formation, the tool sensitivity factor and the weight percentage of the element x. If the neutron flux is constant, the elemental yield $\gamma_x$ can be converted to weight percentages of the element by dividing the gamma count by a sensitivity factor. However, neutron flux in the formation varies from depth-to-depth based on formation and environmental parameters. The variability of the neutron flux can be accounted for by introducing a depth-varying normalization factor F, such that equation (5) becomes:

$$w_x = \frac{F \gamma_x}{S_x} \tag{6}$$

Such depth-varying normalization factors may be determined, such as by oxide closure models as described by R. Hertzog et al. in a paper titled "Geochemical logging with spectrometry tools", SPE Formation Evaluation (pp. 153-162), June 1989.

In accordance with at least some embodiments one or more constraints are determined, and the constraints are then used to limit solutions of the linear equations above to solutions that meet the constraints. Stated conversely, solutions that to not meet the constraints are discarded as not being viable solutions. The constraints in accordance with at least some embodiments are based on the minerals normally encountered in logging situations, and the relative weight percentages of one or more elements in the minerals. In particular, minerals such as quartz, calcite, dolomite and aluminosilicates account for the majority of the formations encountered in petroleum logging operations. The relationship of the weight percentages of various elements in the minerals is known. In a broad sense, the constraints of the various embodiments are defined by the relationship between any two or more elements that make up any two or more minerals. In a particular embodiment a constraint is defined as the relationship of an element that is difficult to detect (e.g., magnesium, aluminum) to an element easier to detect (e.g., calcium). Multiple constraints may be used.

Figure 5:
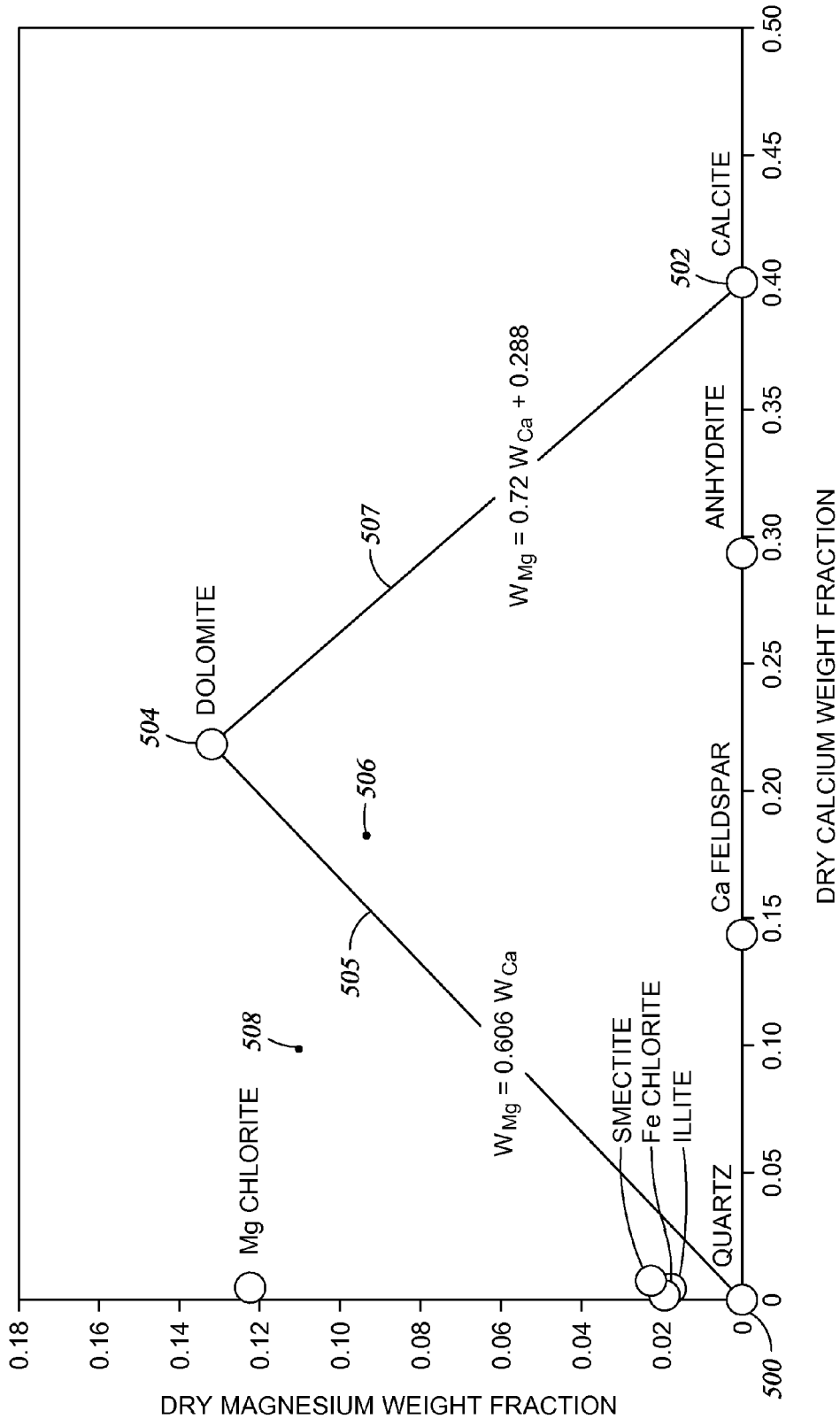
FIG. 5 shows a plot of weight fractions of elements, and shows illustrative constraints, in accordance with at least some embodiments.

FIG. 5 graphically shows a pair of constraints in accordance with at least some embodiments. In particular, FIG. 5 shows calcium weight percentage along the ordinate axis, and magnesium weight percentage along the abscissa axis. Within the plot, several points showing specific minerals are illustrated at the relative weight percentage of the mineral. For example, quartz has no magnesium and no calcium, and thus point 500 for quartz is plotted at the origin. Calcite has no magnesium, but is about 40% calcium, and thus point 502 is plotted on ordinate axis at the 0.4 location. Further, dolomite has about 13% magnesium, and about 22% calcium, and thus point 504 is at the intersection of 0.13 weight fraction magnesium and 0.22 weight fraction calcium.

Pure clay formations do not exist in nature, and the illustratively plotted magnesium chlorite (left side of figure) is very rarely a dominant clay material in shales. Thus, it is highly unlikely that one will find legitimate combinations of calcium and magnesium where the weight percentages fall outside the triangle created by quartz, dolomite and calcite. Given that the formations of interest in petroleum logging will have some combination of clay minerals, quartz, dolomite and calcite, and are highly unlikely to have large percentages of magnesium chlorite, in accordance with at least some embodiments constraints are constructed to limit solutions of the linear equations above to solutions that are physically possible for combinations of quartz, dolomite and calcite. Graphically, the illustrative constraints of FIG. 5 are shown by the triangle created by quartz/dolomite line 505 and the dolomite/calcite line 507.

Applying the constraints, if a solution predicts weight percentages of magnesium and calcium that fall within the triangle, such as illustrative point 506, such a solution meets the constraints and is accepted as a valid solution. By contrast, if a solution predicts weight percentages of magnesium and calcium that fall outside the triangle, such as illustrative point 508, such a solution fails to meet the constraints and is rejected as an invalid solution, in spite of the fact that the solution is non-negative.

While possible to test solutions graphically, as mentioned above in a particular embodiment the solutions are tested against one or more constraints, and accepted or rejected by the solver program, and thus the constraints are tested mathematically. As shown in FIG. 5, the line 505 that links point 500 for quartz to point 504 for dolomite is expressed mathematically as:

$$w_{Mg} = 0.606 w_{Ca} \quad (7)$$

where $w_{Mg}$ is the weight percentage of magnesium, and $w_{Ca}$ is the weight percentage of calcium. The constraint may be tested in the form of an inequality created from equation (7), namely:

$$w_{Mg} - 0.606 w_{Ca} \leq 0 \quad (8)$$

Likewise, the line 507 that links point 504 for dolomite to point 502 for calcite is expressed mathematically as:

$$w_{Mg} = -0.72 w_{Ca} + 0.288 \quad (9)$$

And the constraint may be tested in the form of an inequality created from equation (9), namely:

$$w_{Mg} + 0.72 w_{Ca} - 0.288 \leq 0 \quad (10)$$

The illustrative solvers noted above, NPSOL and MCR, have the ability to not only accept the illustrative linear equations, but also inequalities against which to test solutions found.

However, the illustrative system of linear equations results in a series of elemental yields, rather than directly indicating weight percentages. Thus, in order for the solver to apply the inequalities, the inequalities need to be stated in terms of the elemental yields. Applying equation (6) above, which relates weight percentages to elemental yields, to the inequality for the constraint of equation (8), the inequality becomes:

$$F \frac{\gamma_{Mg}}{S_{Mg}} - 0.606 F \frac{\gamma_{Ca}}{S_{Ca}} \leq 0 \quad (11)$$

The normalization factor F mathematically cancels, however, leaving the inequality as:

$$\gamma_{Mg} - 0.606 \frac{S_{Mg}}{S_{Ca}} \gamma_{Ca} \leq 0 \quad (12)$$

which inequality may thus be directly applied to the elemental yields calculated for the illustrative system of linear equations above.

Applying equation (6) above to the inequality for the constraint of equation (10), the inequality becomes:

$$F \frac{\gamma_{Mg}}{S_{Mg}} + 0.72 F \frac{\gamma_{Ca}}{S_{Ca}} - 0.288 \leq 0 \quad (13)$$

The normalization factor F does not mathematically cancel from equation (13). Since the solver in some cases is not directly aware of the normalization factor F, the solver cannot test the inequality of equation (13) directly. Thus, in cases where the constraint is a function of the normalization factor, an expression for the normalization factor is found as a function of known variables. In particular, the oxides closure model may be implemented to obtain an expression for the normalization factor. The oxides closure model assumes the primary formation elements measured sum exists as a single oxide or carbonate, and they sum to unity. Mathematically then:

$$F \left[ \sum_i O_i \frac{\gamma_i}{S_i} \right] = 1 \quad (14)$$

Where $O_i$ is the ratio of the oxide or carbonate associated with element i to the weight of element i. Thus, the inequality of equation (13) in view of equation (14) becomes:

$$\frac{\gamma_{Mg}}{S_{Mg}} + 0.72 \frac{\gamma_{Ca}}{S_{Ca}} - 0.288 \sum_i O_i \frac{\gamma_i}{S_i} \leq 0 \quad (15)$$

which equation can be evaluated by the solver.

Figure 6:
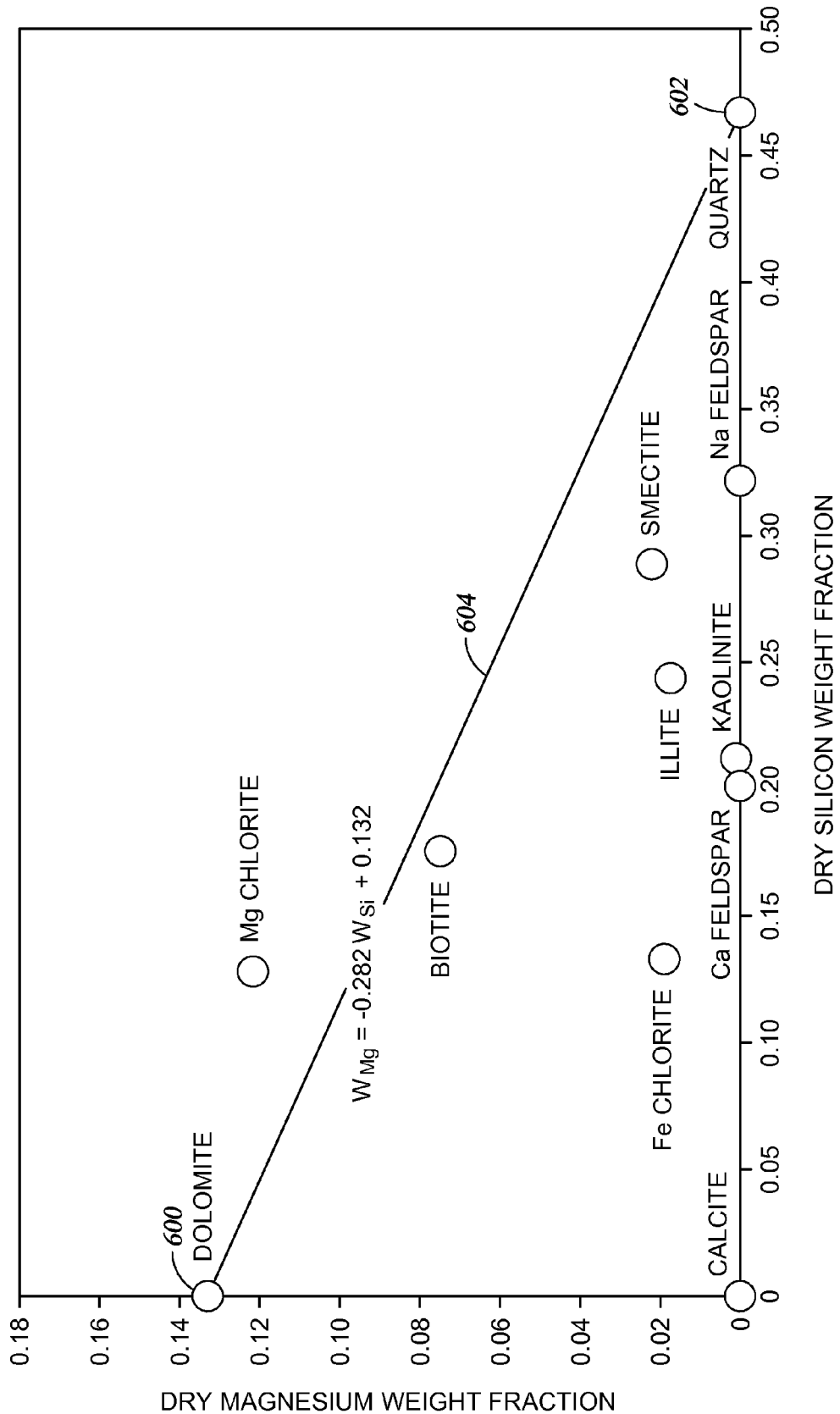
FIG. 6 shows a plot of weight fractions of elements, and shows an illustrative constraint, in accordance with at least some embodiments.

The constraints illustrated in FIG. 5, and shown mathematically herein, are merely illustrative. The various embodiments contemplate use of a single constraint (e.g., just the quartz/dolomite line in FIG. 5), or use of a plurality of constraints (e.g., both the quartz/dolomite and dolomite/calcite lines), in evaluating solutions to the illustrative system of linear equations. Moreover, the constraints are not limited to just relationships between magnesium and calcite, and thus constraints relating to different elements may be used. For example, FIG. 6 graphically shows a constraint in accordance with other embodiments. In particular, FIG. 6 shows silicon weight fraction along the ordinate, and magnesium weight fraction along the abscissa. Within the plot, several points showing specific minerals are illustrated at the relative weight percentage of the mineral. For example, dolomite has no silicon, but is about 13% magnesium, and thus point 600 for dolomite is plotted directly on the abscissa. Quartz has no magnesium, but is about 47% silicon, and thus point 602 is plotted directly on ordinate axis.

Again, the illustratively plotted magnesium chlorite (left-middle of figure) is rarely a dominant clay material in shales, and thus it is highly unlikely that one will find legitimate combinations of magnesium and silicon where the weight percentages fall above the line 604 connecting dolomite and quartz. Given that the formations of interest in petroleum logging will have some combination of clay minerals quartz, dolomite and calcite, and are highly unlikely to have large percentages of magnesium chlorite, here again a constraint may be constructed to limit solutions of the illustrative linear equations above to solutions that are physically possible for combinations of quartz, dolomite and calcite. Graphically, the illustrative constraint of FIG. 6 is any solution that falls below the line 604, which line 604 has the mathematical form:

$$w_{Mg}=-0.282w_{Si}+0.132 \tag{16}$$

Equation (16), prior to being provided to the solver, would be recast in terms of elemental yields as discussed above.

Figure 7:
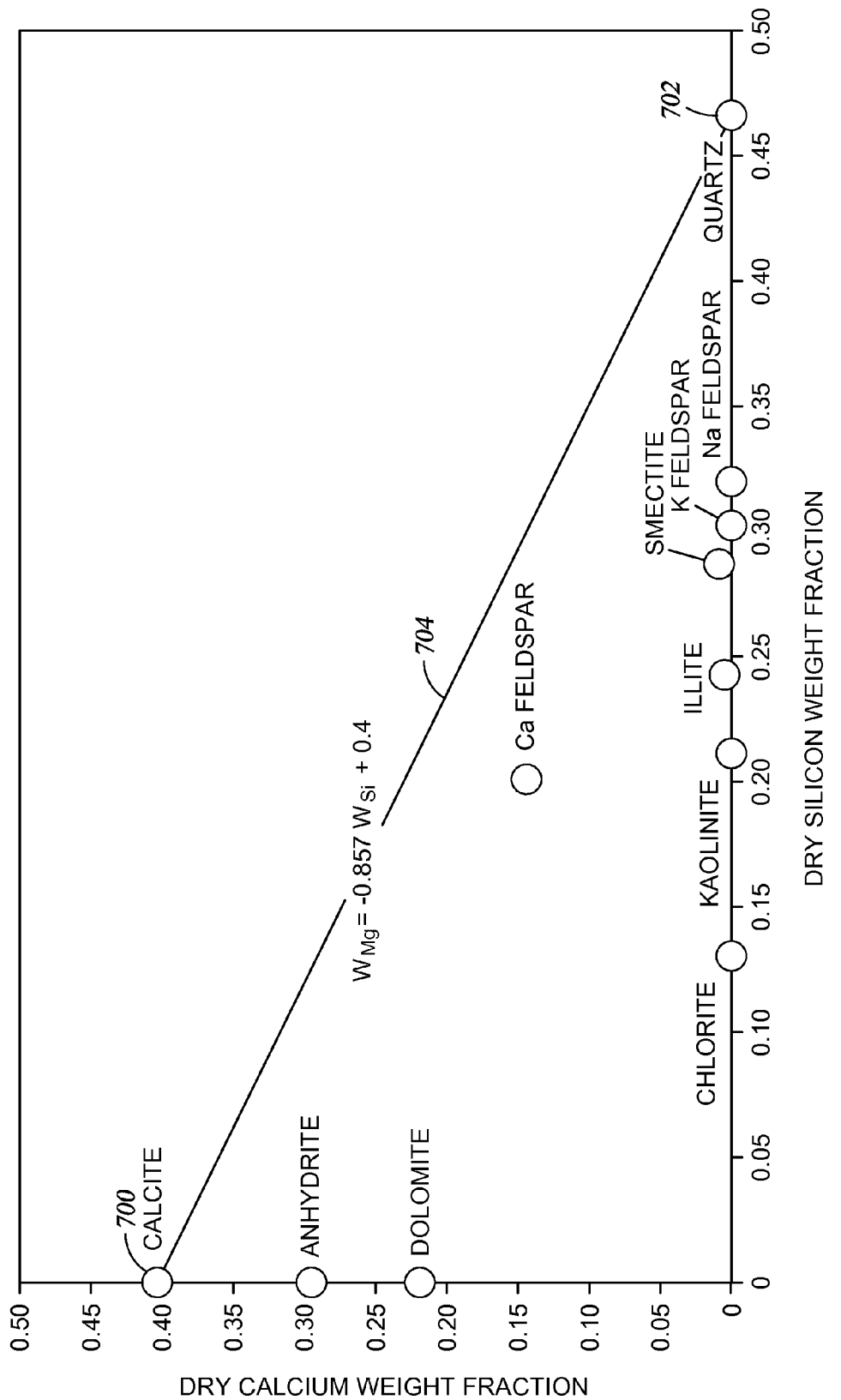
FIG. 7 shows a plot of weight fractions of elements, and shows an illustrative constraint, in accordance with at least some embodiments.

FIG. 7 graphically shows a constraint in accordance with other embodiments. In particular, FIG. 7 shows silicon weight fraction along the ordinate, and calcium weight fraction along the abscissa. Within the plot, several points showing specific minerals are illustrated at the relative weight percentage of the mineral. For example, calcite has no silicon, but is about 40% calcium, and thus point 700 for calcite is plotted directly on the abscissa. Quartz has no calcium, but is about 47% silicon, and thus point 702 is plotted on ordinate axis at the 0.47 location. Given that the formations of interest in petroleum logging will have some combination of clay minerals, quartz and calcite, here again a constraint may be constructed to limit solutions of the illustrative linear equations above to solutions that are physically possible for combinations of quartz and calcite. Graphically, the illustrative constraint of FIG. 7 is any solution that falls below the line 704, which line 704 has the mathematical form:

$$w_{Ca}=-0.857w_{Si}+0.4 \tag{17}$$

Equation (17), prior to being provided to the solver, would be recast in terms of elemental yields as discussed above.

Figure 8:
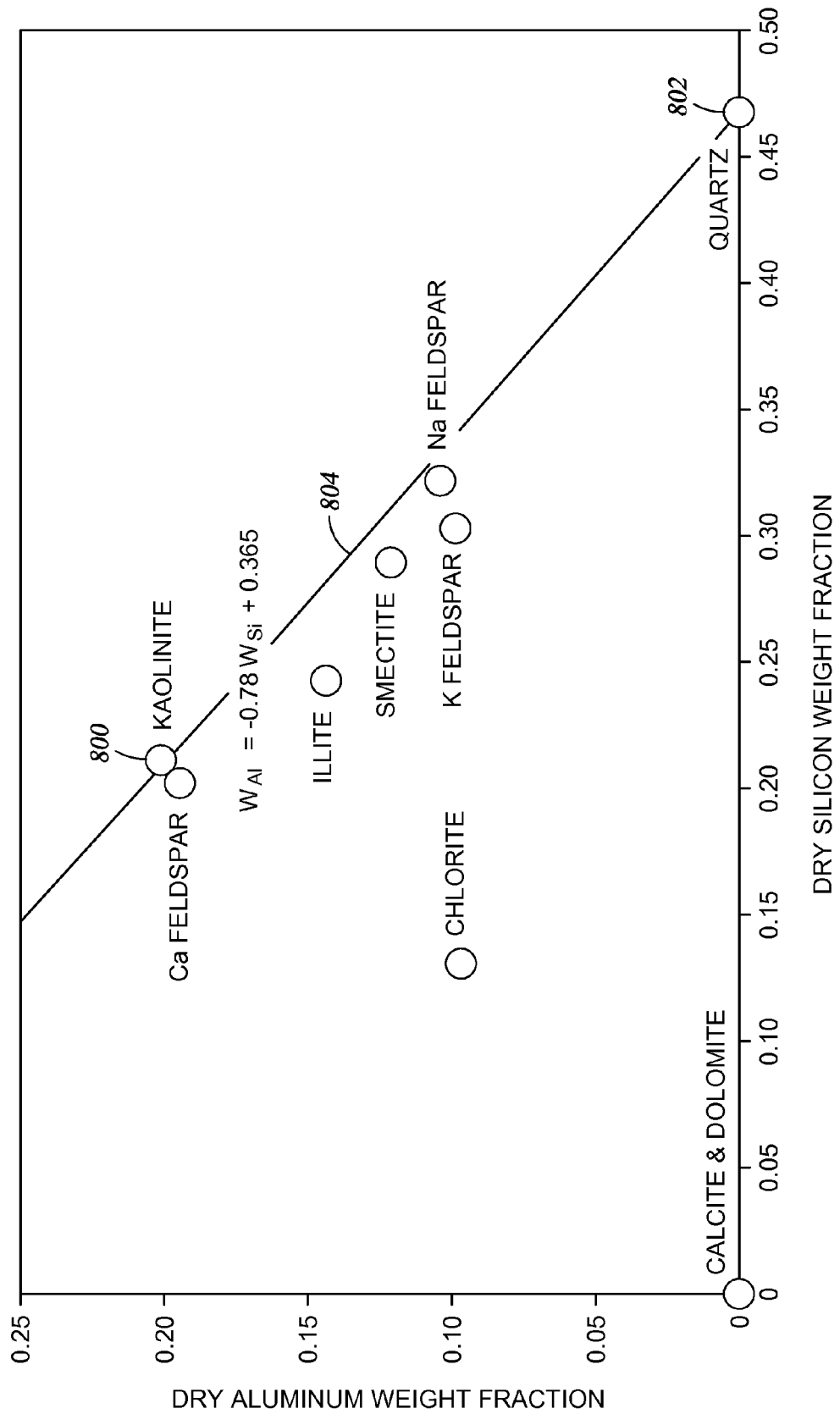
FIG. 8 shows a plot of weight fractions of elements, and shows an illustrative constraint, in accordance with at least some embodiments.

FIG. 8 graphically shows a constraint related to aluminum in accordance other embodiments. In particular, FIG. 8 shows silicon weight fraction along the ordinate, and aluminum weight fraction along the abscissa. Within the plot, several points showing specific minerals are illustrated at the relative weight percentage of the elements within the minerals. For example, kaolinite has about 20% aluminum and about 21% silicon, and thus point 800 is plotted at the intersection of 0.20 aluminum and 0.21 silicon weight fractions. Quartz has no aluminum, but is about 47% silicon, and thus point 802 is plotted on ordinate axis at the 0.47 location. Given that no mineral of interest lies outside the line connecting kaolinite and quartz, here again a constraint may be constructed to limit solutions of the illustrative linear equations above to solutions that fall below the line 804, which line 804 has the mathematical form:

$$w_{Al}=-0.78w_{Si}+0.365 \tag{18}$$

Equation (18), prior to being provided to the solver, would be recast in terms of elemental yields as discussed above.

Figure 9:
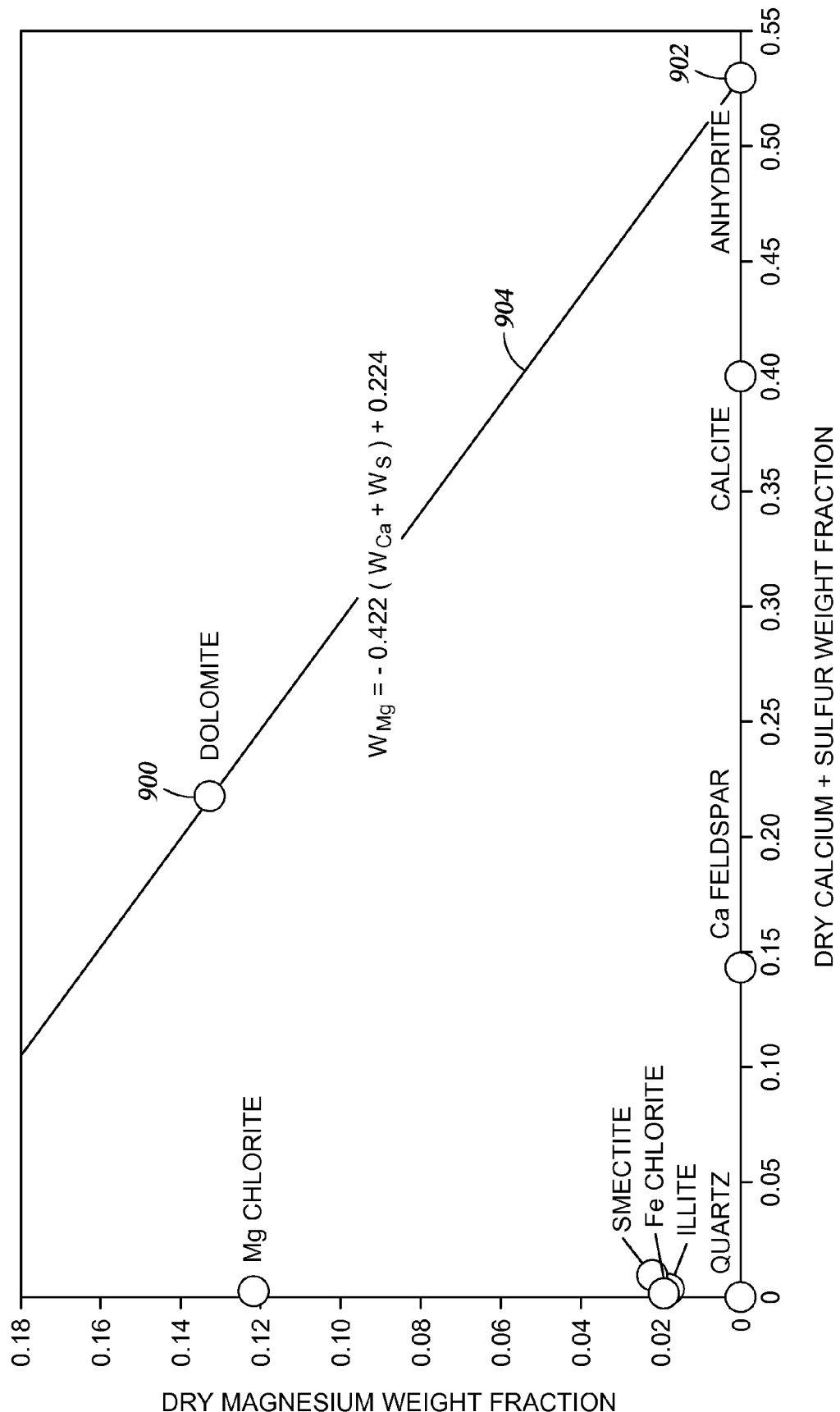
FIG. 9 shows a plot of weight fractions of elements, and shows an illustrative constraint, in accordance with at least some embodiments.

Further still, the constraints need not be limited to the relationship between a first single element and a second single element. In accordance with at least some embodiments the constraints may relate multiple elements to each other. FIG. 9 graphically shows a constraint in accordance other embodiments. In particular, FIG. 9 shows a combination of calcium and sulfur weight fraction along the ordinate axis, and magnesium weight fraction along the abscissa axis. Within the plot, several points showing specific minerals are illustrated at the relative weight percentage of the mineral. For example, dolomite has about 13% magnesium and about 22% combination calcium and sulfur, and thus point 900 is plotted at the intersection of 0.13 magnesium and 0.22 combined calcium/sulfur weight fractions. Anhydrite has no magnesium, but is about 53% combined calcium/sulfur, and thus point 902 is plotted on ordinate axis at the 0.53 location.

Given that the formations of interest in petroleum logging may have some combination of clay minerals, quartz, calcite, dolomite and anhydrite here again a constraint may be constructed to limit solutions of the illustrative linear equations above to solutions that are physically possible for combinations of dolomite and anhydrite. Given that no mineral of interest lies above the line connecting dolomite and anhydrite, here again a constraint may be constructed to limit solutions of the illustrative linear equations above to solutions that fall below the line 904, which line 904 has the mathematical form:

$$w_{Mg}=-0.422(w_{Ca}+w_s)+0.224 \tag{19}$$

Equation (19), prior to being provided to the solver, would be recast in terms of elemental yields as discussed above.

The various constraints to this point have all been shown graphically as two-dimensional plots; however, the plots have been limited to two dimensions only so as to help the reader visualize how the constraints operate. Any constraint relating three or more elements may be represented in a multi-dimensional form (one dimension for each element), and thus the two-dimensional representations of the constraints shall not be read to limit applicability of the various embodiments. For example, the plot of FIG. 9 could be recast as a three dimensional plot relating magnesium, calcium and sulfur weight fractions. The constraint in such a three-dimensional situations would thus be a surface in three dimensions, with valid solutions falling "below" the surface and invalid solutions residing "above" the surface.

The various embodiments discussed to this point have been based on constraints selected by a working knowledge of expected clay minerals in logged formations of interest. However, in yet still other embodiments the constraints may be selected, at least in part, based on actual formation tests run prior to the logging run generating the gamma counts. For example, some oilfield technology companies can perform mineralogical tests on cuttings that are carried to the surface by the drilling fluid. The results of such mineralogical tests could be used to help inform the selection of constraints to implement. For example, if absolutely no magnesium chlorite is found in the samples of drill cuttings, then constraints such as those graphically shown in FIGS. 5 and 6 may be selected. By contrast, if magnesium chlorite is found is found, the constraints may be modified accordingly (e.g., a constraint as illustrated by a line connecting dolomite and magnesium chlorite.

Further still, the various constraints to this point have assumed a Boolean test condition—either the solution meets the constraint, or does not. However, in yet still further embodiments the constraint may instead represent solutions that should be more closely evaluated. For example, if a solution falls squarely within the triangle created by constraints graphically illustrative in FIG. 5, then the solution may be accepted without further processing; however, if a solution falls close to a line representing a constraint (even solutions that in a Boolean sense do not meet the constraint), then further processing and/or evaluation may be completed to make the final decision to accept or reject the solution. For example, again referring to FIG. 5, solutions that fall just outside the quartz/dolomite line may be evaluated in view of further evidence. If testing of drill cuttings reveals the presence of magnesium chlorite in the formation, then a proposed solution that falls just outside the quartz/dolomite line may nonetheless be accepted as a valid result. Thus, in these embodiments rather than considering the constraint as a Boolean test, the constraint (along with an indication of how closely a solution met or failed the test of the constraint) may be considered a range of solutions deserving further evaluation.

Figure 10:
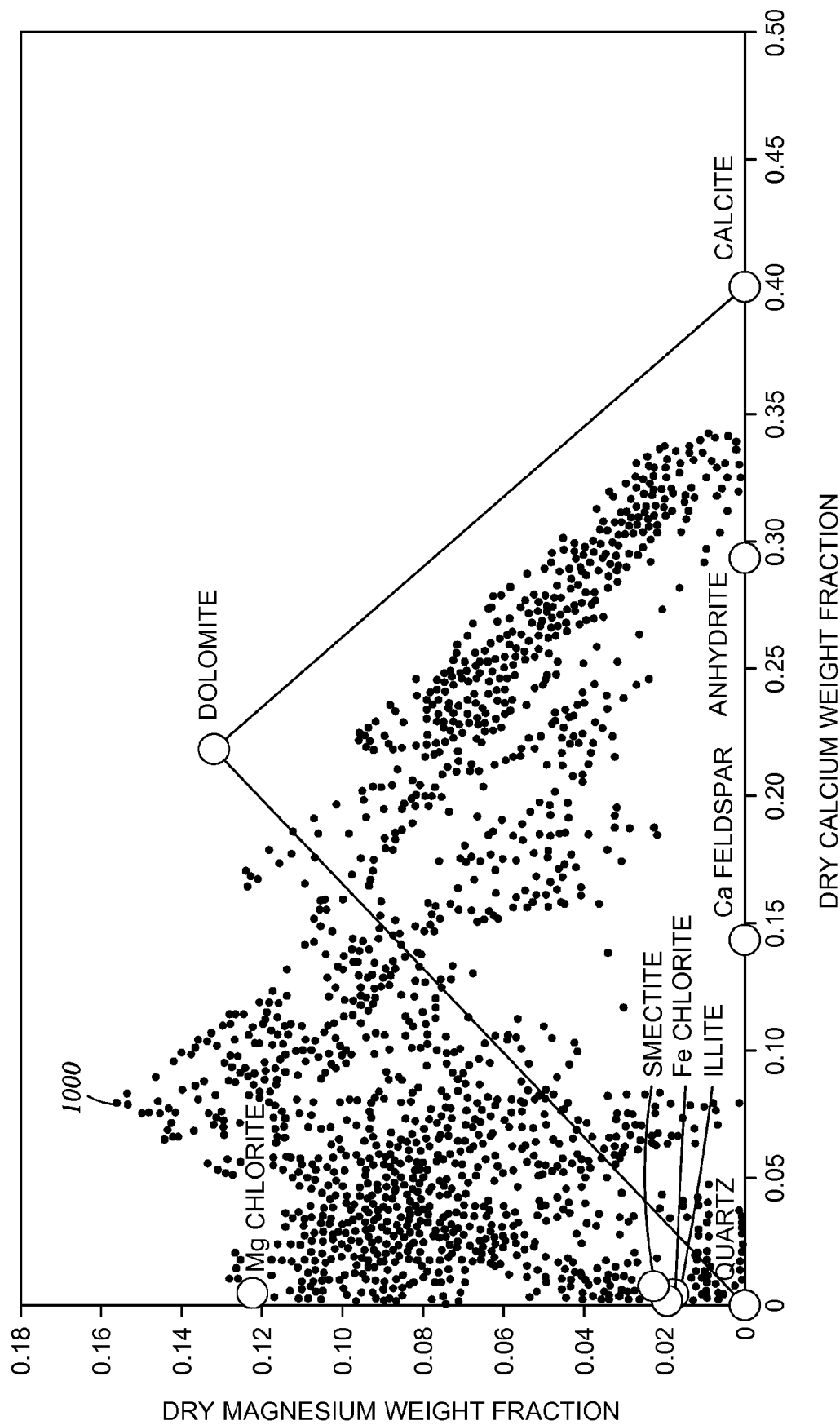
FIG. 10 shows a plot of solutions for which no element-based constraints have been applied.
Figure 11:
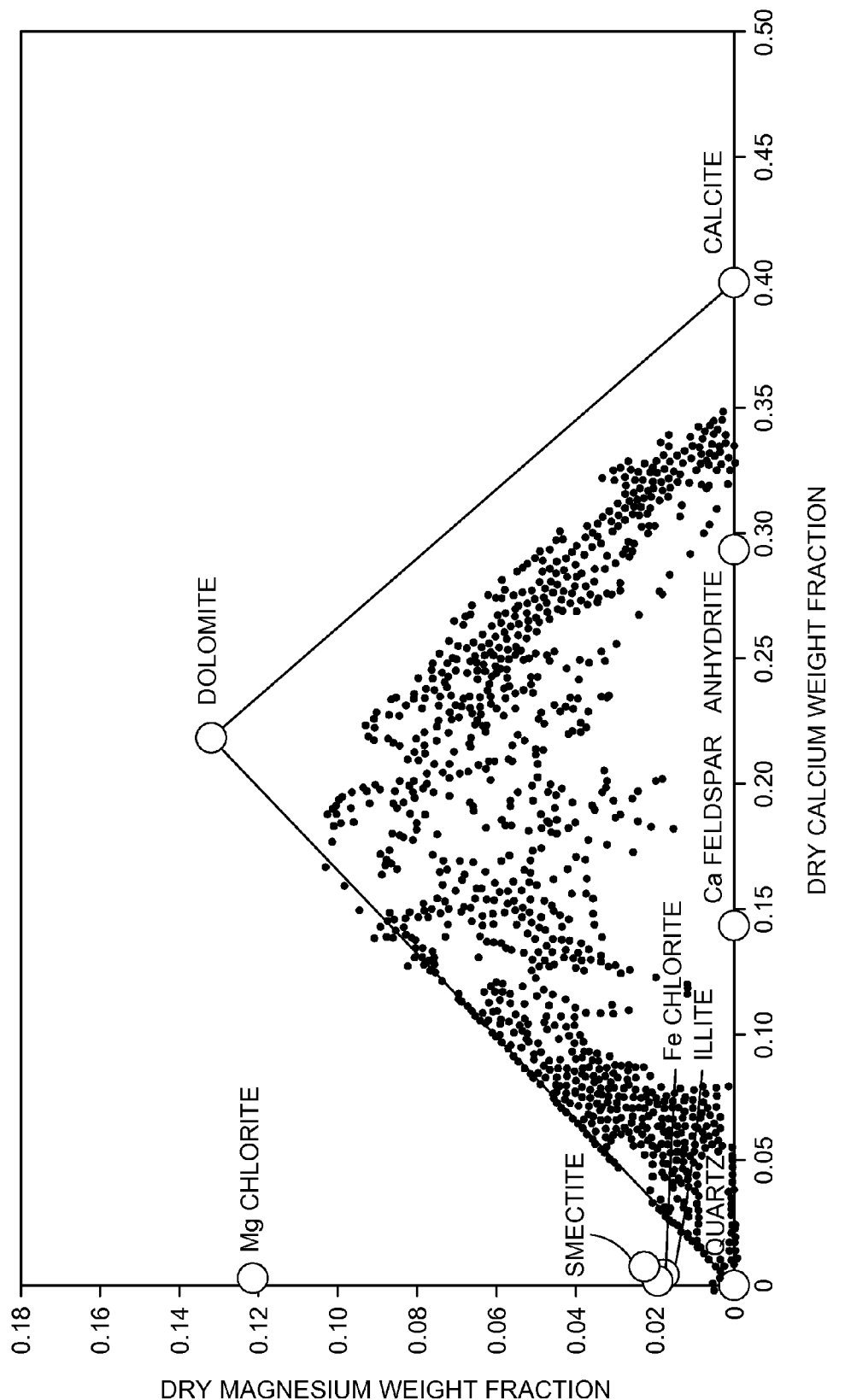
FIG. 11 shows a plot of solutions for which element-based constraints have been applied.

In order to test using constraints to limit viable solutions to the illustrative system of linear equations, the inventor of the technology of this specification experimentally tested the technology based on data obtained from a logging interval of an actual formation. The logging interval included sandstone, limestone and shale formations. FIG. 10 plots solutions where non-negativity was imposed, but no mineralogical constraints were imposed, the results plotted by magnesium weight fraction against calcium weight fraction (i.e., similar to FIG. 5). In particular, each small black dot (e.g., point 1000) represents a solution produced by the solver for an incremental depth of the logging run. Note how a significant number of the solutions indicate high magnesium content (i.e., points residing beyond the line connecting quartz (at the origin) and dolomite). In fact, illustrative solution 1000, though a viable mathematical solution, indicates a higher magnesium content than would be present in a 100% dolomite formation. By contrast, FIG. 11 shows solutions from the same logging interval as FIG. 10, but with the solutions constrained as discussed herein. The solutions illustrated in FIG. 11 are more likely to represent actual formation lithology, even taking into consideration that some magnesium chlorite may be present.

Figure 12:
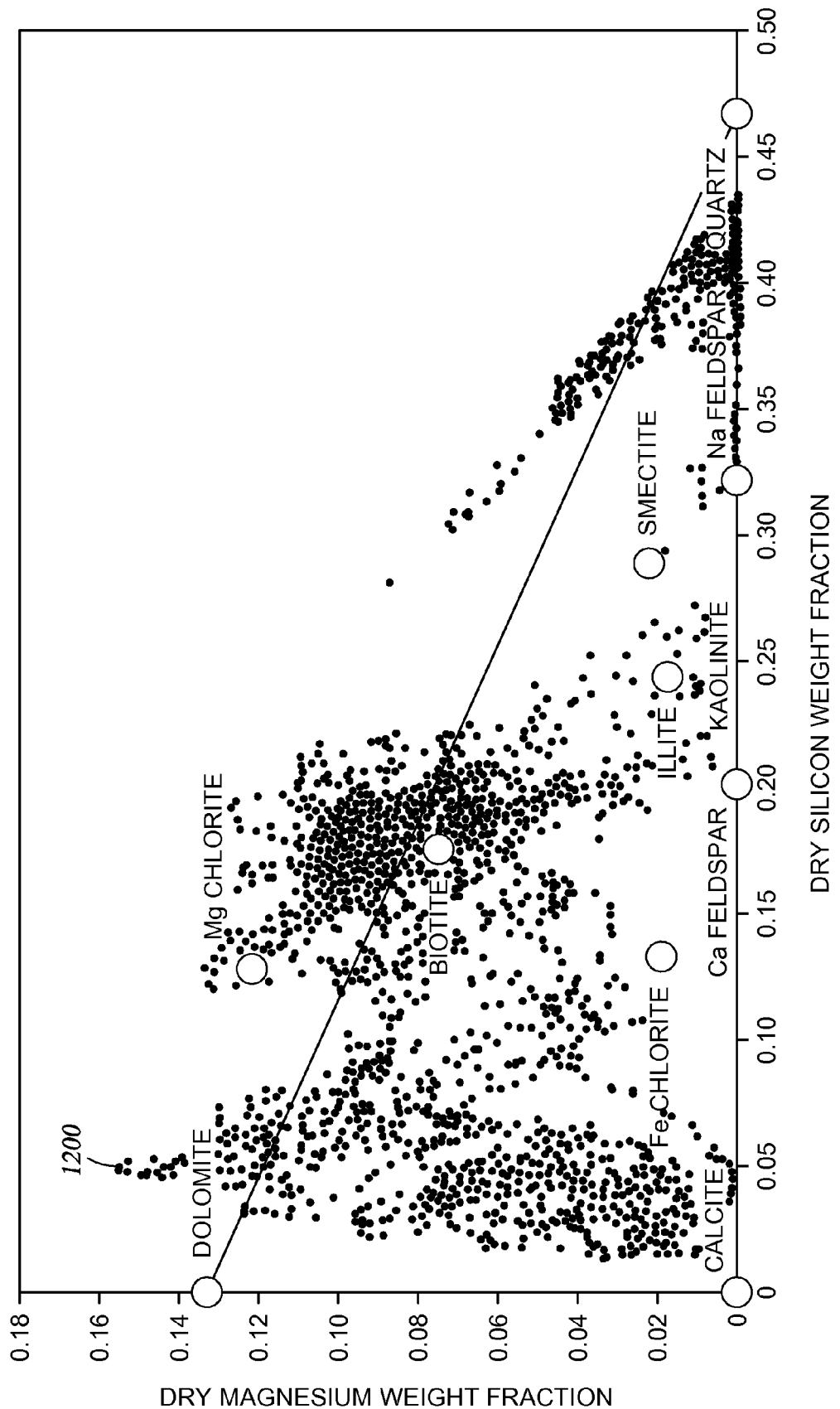
FIG. 12 shows a plot of solutions for which no element-based constraints have been applied.
Figure 13:
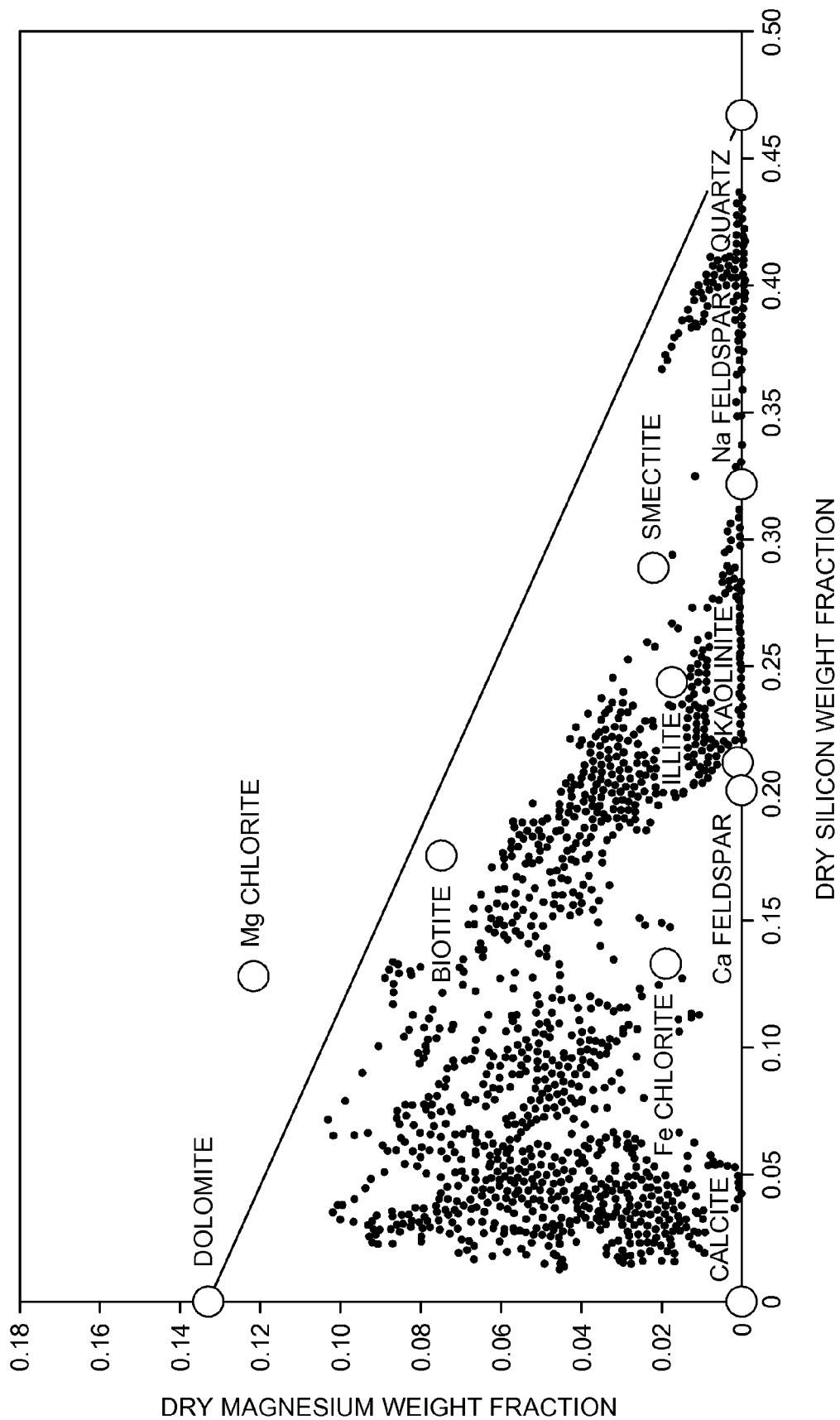
FIG. 13 shows a plot of solutions for which element-based constraints have been applied.

FIG. 12 likewise plots solutions where non-negativity was imposed, but no mineralogical constraints were imposed, the results plotted by magnesium weight fraction against calcium weight fraction (i.e., similar to FIG. 6). In particular, each small black dot (e.g., point 1200) represents a solution produced by the solver for an incremental depth of the logging run. Note how a significant number of the solutions indicate high magnesium content (i.e., points residing above the line connecting quartz and dolomite). In fact, illustrative solution 1200, though a viable mathematical solution, indicates higher magnesium content than would be present in a 100% dolomite formation. By contrast, FIG. 13 shows solutions the same logging interval as FIG. 12, but with the solutions constrained as discussed herein. The solutions illustrated in FIG. 13 are more likely to represent actual formation lithology, even taking into consideration that some magnesium chlorite may be present.

Figure 14:
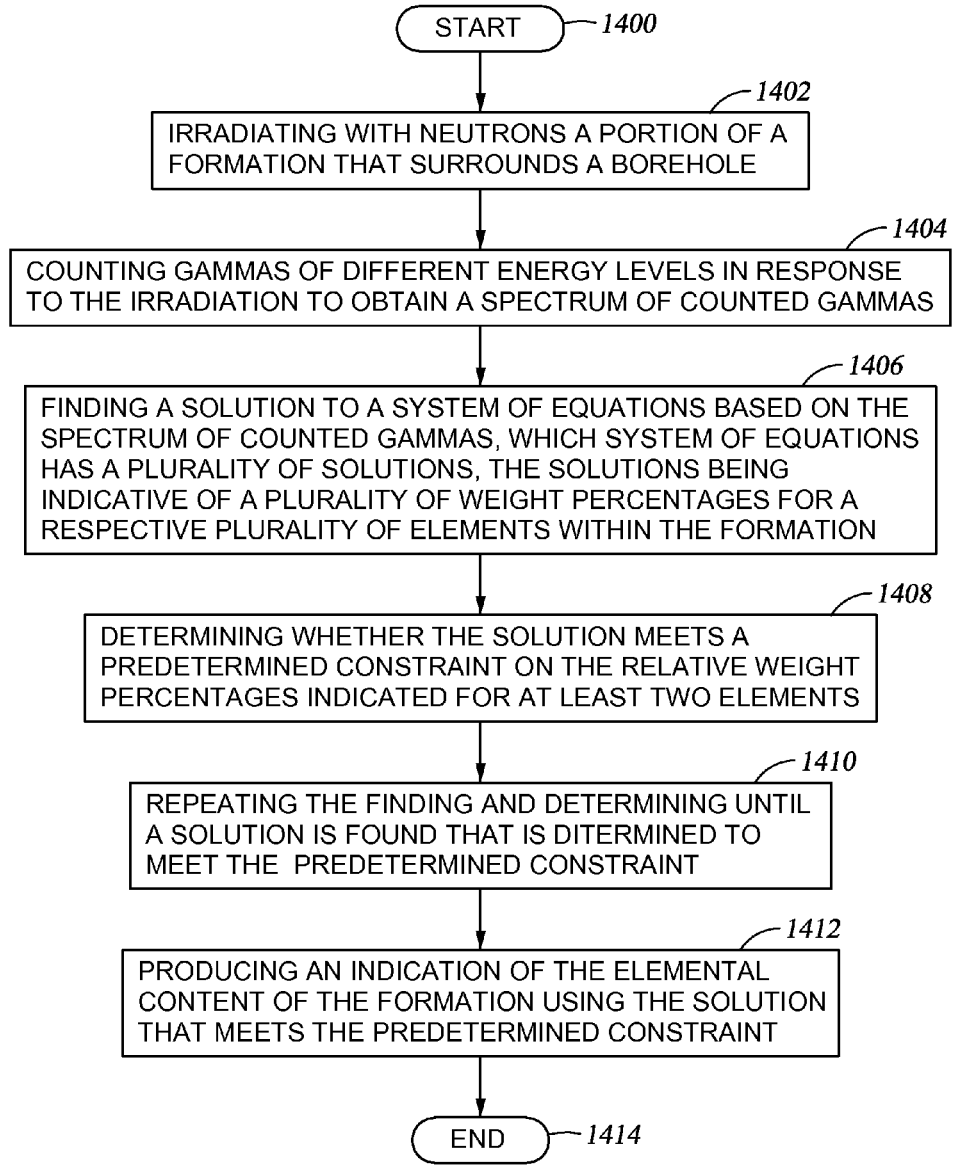
FIG. 14 shows a method in accordance with at least some embodiments.

FIG. 14 shows a method in accordance with at least some embodiments. In particular, the method starts (block 1400) and proceeds to: irradiating with neutrons a portion of a formation that surrounds a borehole (block 1402); counting gammas of different energy levels in response to the irradiation to obtain a spectrum of counted gammas (block 1404); finding a solution to a system of equations based on the spectrum of counted gammas, which system of equations has a plurality of solutions, the solution being indicative of a plurality of weight percentages for a respective plurality of elements within the formation (block 1406); determining whether the solution meets a predetermined constraint on the relative weight percentages indicated for at least two of the elements (block 1408); repeating the finding and determining until a solution is found that is determined to meet the predetermined constraint (block 1410); and producing an indication of the elemental content of the formation using the solution that meets the predetermined constraint (block 1412). Thereafter, the method ends (block 1414). It will be appreciated that, at least in theory, plural mathematical solutions to the system of equations may exist which meet the constraints imposed on the solution. Although it would be possible to identify all such solutions for each incremental depth at which a spectrum of counted gammas is obtained, it is presently contemplated simply to acquire the first solution that can be found, for any particular spectrum of counted gammas, which meets (or is deemed sufficiently close to meeting) all of the constraints imposed.

Figure 15:
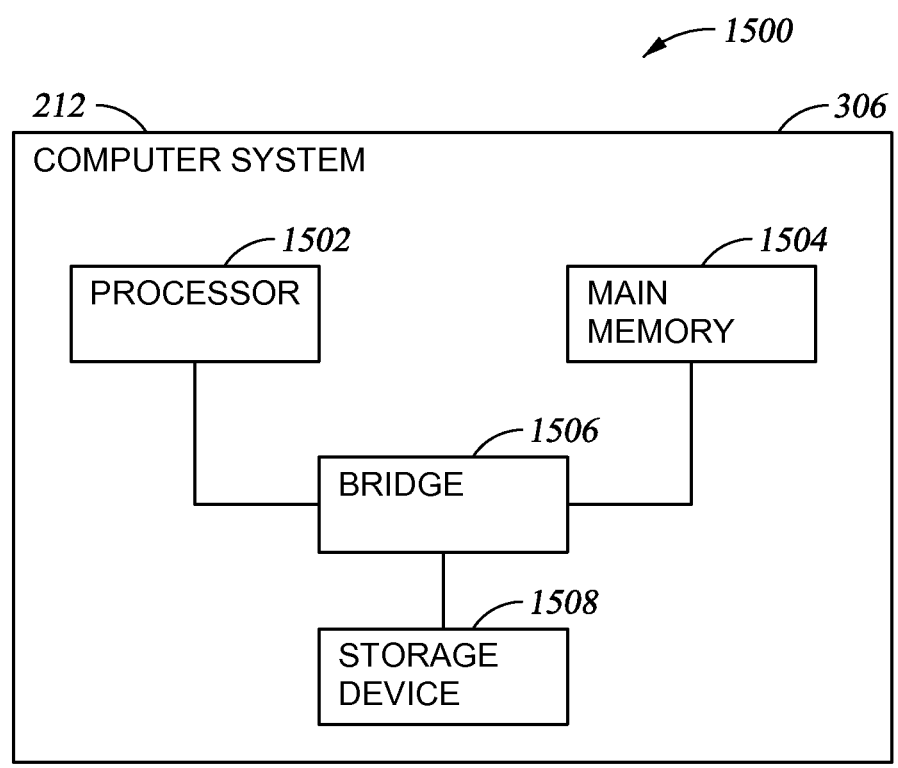
FIG. 15 shows a computer system in accordance with at least some embodiments.

FIG. 15 illustrates in greater detail a computer system 1500, which is illustrative of a computer system upon which the various embodiments may be practiced. The computer system 1500 may be, for example, surface computer system 212, or the computer system 1500 may reside within the pressure vessel for MWD and LWD applications, for example computer system 306. The computer system 1500 comprises a processor 1502, and the processor couples to a main memory 1504 by way of a bridge device 1506. Moreover, the processor 1502 may couple to a long term storage device 1508 (e.g., a hard drive, "floppy" disk, memory stick, optical disc) by way of the bridge device 1506. Programs executable by the processor 1502 may be stored on the storage device 1508, and accessed when needed by the processor 1502. The program stored on the storage device 1508 may comprise programs to implement the various embodiments of the present specification, such programs to solve systems of linear equations (including applying constraints), and predict elemental content. In some cases, the programs are copied from the storage device 1508 to the main memory 1504, and the programs are executed from the main memory 1504. Thus, both the main memory 1504 and storage device 1508 shall be considered computer-readable storage mediums. The results of the modeling by the computer system 1500 may be sent to a display device which may make a representation for viewing by a geologist or other person skilled in the art.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, while the various illustrative constraints are shown relating weight percentages of elements, any value indicative of weight percentage may be equivalently used in the constraint (e.g., elemental yields, values indicative of a number of atoms of each element, count values for the elements, number of moles of each element). It is intended that the following claims be interpreted to embrace all such variations and modifications.

I claim:
1. A method comprising:
irradiating with neutrons a portion of a formation that surrounds a borehole with a source of neutrons from a tool positioned in the borehole;
counting gammas of different energy levels in response to the irradiation to obtain a spectrum of counted gammas with a gamma detector positioned in the borehole;
finding a solution to a system of equations based on the spectrum of counted gammas, which system of equations has a plurality of solutions, the solution being indicative of a plurality of weight percentages for a respective plurality of elements within the formation;

determining whether the solution meets a predetermined constraint on the relative weight percentages indicated for at least two of the elements within the formulation;

repeating the finding and determining until a solution is found that is determined to meet the predetermined constraint; and outputting an indication of the elemental content of the formation using the solution that meets the predetermined constraint.

2. The method of claim 1, wherein the predetermined constraint is determined from known weight percentages of the at least two elements in at least two minerals.

3. The method of claim 1, wherein determining further comprises determining whether the solution meets a further predetermined constraint on the relative weight percentages indicated for a third element, different from the at least two elements, and a fourth element, and repeating further comprises repeating the finding and determining until a solution is found that is determined also to meet the further predetermined constraint.

4. The method of claim 3, wherein the fourth element is the same element as one of the at least two elements.

5. The method of claim 1, wherein the predetermined constraint relates the indicated weight percentage for at least one of the at least two elements to the weight percentages indicated for a plurality of the other elements within the formation.

6. The method of claim 1, wherein the at least two elements include one or both of: magnesium; and aluminum.

7. The method of claim 1, wherein irradiating further comprises irradiating with neutrons that, when departing the neutron source, have a mean energy of at least one selected from the group consisting of: about 4.5 Mega-electron Volts (MeV); and about 2.3 MeV.

8. The method of claim 1, wherein irradiating further comprises irradiating with neutrons from a continuous source of neutrons.

9. The method of claim 1, wherein irradiating further comprises irradiating the formation by way of a pulsed neutron source.

10. A system comprising:

a tool configured to be placed within a borehole in an earth formation, the tool comprising:

a source of neutrons; and a gamma detector to detect gammas of different energy levels; and a processor coupled to the gamma detector to:

find a solution to a system of equations based on the spectrum of counted gammas obtained by counting gammas of different energy levels detected at the gamma detector, the system of equations having a plurality of solutions, and the solution being indicative of a plurality of weight percentages for a respective plurality of elements within the formation;

determine whether the solution meets a predetermined constraint on the relative weight percentages indicated for at least two of the elements; and if the solution does not meet the predetermined constraint, discard the solution and repeat the processes to find a different solution to the system of equations until a solution is found which is determined to meet the predetermined constraint.

11. The system of claim 10, wherein the predetermined constraint is determined from known weight percentages of the at least two elements in at least two minerals.

12. The system of claim 10, wherein when the processor is further to:

determine whether the solution meets a further predetermined constraint on the relative weight percentages indicated for a third element, different from the at least two elements, and a fourth element; and, if the solution does not meet the further predetermined constraint, discard the solution and repeat the processes to find a different solution to the system of equations until a solution is found which is determined to meet both predetermined constraints.

13. The system of claim 10, wherein the predetermined constraint relates the weight percentage indicated for at least one of the at least two elements to the weight percentages indicated for a plurality of the other elements within the formation.

14. The system of claim 10, wherein the at least two elements include one or both of: magnesium; and aluminum.

15. The system of claim 10, wherein the source of neutrons is to produce neutrons that have a mean energy of at least one selected from the group consisting of: about 4.5 Mega-electron Volts (MeV); and about 2.3 MeV.

16. The system of claim 10, wherein the source of neutrons is a continuous source of neutrons.

17. The system of claim 10, wherein the source of neutrons is a pulsed source.

18. The system of claim 10, wherein the tool includes a wireline logging pressure vessel, with the neutron source and gamma detector disposed within the pressure vessel.

19. The system of claim 10, wherein the tool is or can be coupled within a drill string.

20. A non-transitory computer-readable medium storing a program that, when executed by a processor, causes the processor to:

find a solution to a system of equations based on a spectrum of counted gammas received from a gamma detector of a tool positioned in a borehole of a formation, which system of equations has a plurality of solutions, the solution being indicative of a plurality of weight percentages for a respective plurality of elements within formation;

determine whether the solution meets a predetermined constraint on the relative weight percentages indicated for at least two of the elements with the formulation; and if the solution does not meet the predetermined constraint, discard the solution and repeat the processes to find a different solution to the system of equations until a solution is found which is determined to meet the predetermined constraint.

21. The non-transitory computer-readable medium of claim 20, wherein the predetermined constraint is determined from known weight percentages of the at least two elements in at least two minerals.

22. The non-transitory computer-readable medium of claim 20, wherein, when executed by a processor, the program further causes the processor to:

determine whether the solution meets a further predetermined constraint on the relative weight percentages indicated for a third element, different from the at least two elements, and a fourth element; and, if the solution does not meet the further predetermined constraint, discard the solution and repeat the processes to find a different solution to the system of equations until a solution is found which is determined to meet both predetermined constraints.

23. The non-transitory computer-readable medium of claim 20, wherein the predetermined constraint relates the weight percentage indicated for at least one of the at least two elements to the weight percentages indicated for a plurality of the other elements within the formation.

* * * * *

UNITED STATES PATENT AND TRADEMARK OFFICE
CERTIFICATE OF CORRECTION

| | | |
|---|---|---|
| PATENT NO. | : 9,310,514 B2 | |
| APPLICATION NO. | : 13/810975 | |
| DATED | : April 12, 2016 | |
| INVENTOR(S) | : James E. Galford | |

It is certified that error appears in the above-identified patent and that said Letters Patent is hereby corrected as shown below:

In the Claims

Column 14:

Claim 1, line 5 "...at least two of the elements within the formulation..." should read --...at least two of the elements within the formation:...--

Column 16:

Claim 20, line 41 "...a tool positioned in a borehole of a formulation..." should read --...a tool positioned in a borehole of a formation...--

Claim 20, line 48 "...for at least two of the elements within the formulation..." should read --...for at least two of the elements with the formation...--

Signed and Sealed this
Ninth Day of August, 2016

Michelle K. Lee
*Director of the United States Patent and Trademark Office*